United States Patent [19]
Freedman

[11] 3,742,500
[45] June 26, 1973

[54] MTI RADAR

[75] Inventor: Nathan Freedman, West Newton, Mass.

[73] Assignee: Raytheon Company, Lexington, Mass.

[22] Filed: Aug. 24, 1970

[21] Appl. No.: 66,394

[52] U.S. Cl. ............................. 343/7.7, 343/5 DP
[51] Int. Cl. ............................................. G01s 9/42
[58] Field of Search ........................ 343/5 DP, 7.7

[56] References Cited
UNITED STATES PATENTS

| | | | |
|---|---|---|---|
| 3,161,874 | 12/1964 | Page | 343/7.7 |
| 3,201,789 | 8/1965 | Fine | 343/7.7 |
| 3,417,396 | 12/1968 | Stifter et al. | 343/7.7 |

Primary Examiner—Malcolm F. Hubler
Attorney—Philip J. McFarland and Joseph D. Pannone

[57] ABSTRACT

A radar system adapted to discriminate between signals from clutter and moving targets. The disclosed system includes at least one digital canceller and an associated digital correction circuit which together are operative to produce a digital signal indicative of the average Doppler frequency of all targets within a selected group of range cells. Such digital signal, in turn, is applied to a digital phase shifter in circuit with the output signal from a reference oscillator to shift the frequency of such output signal until the clutter rejection notch of the digital canceller is centered on the average Doppler frequency of the targets within the selected group of range cells.

1 Claim, 1 Drawing Figure

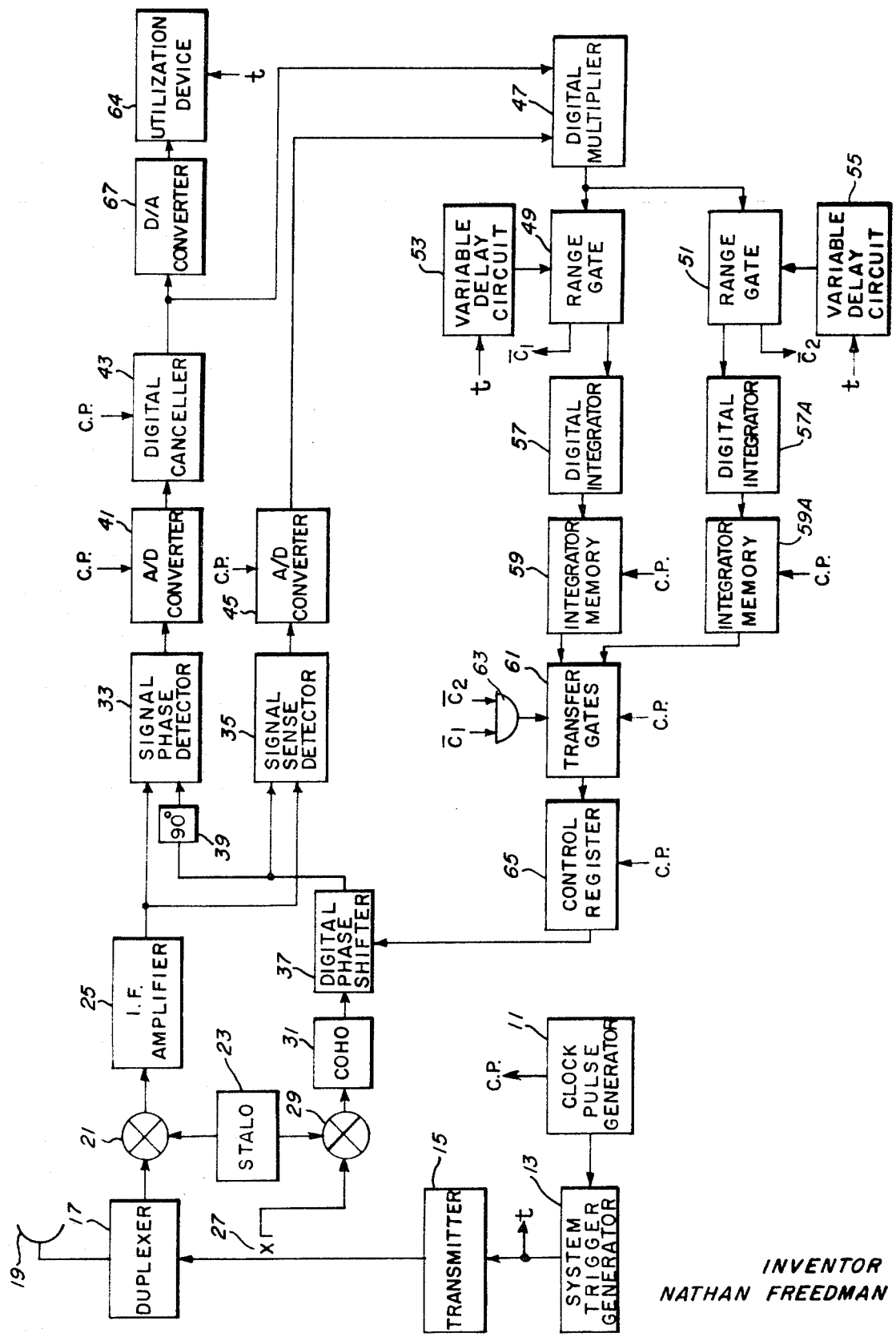

MTI RADAR

BACKGROUND OF THE INVENTION

This invention pertains generally to MTI radar and particularly to radar of such type in which returned signals are digitally processed.

It is known in the radar art that "time-averaged-clutter coherent airborne radar," usually referred to by the acronym "TACCAR," is useful in almost all applications for solution of the moving target indication (MTI) problem. Any TACCAR system has the ability automatically to center the clutter-rejection notch of its canceller at the average Doppler frequency of the clutter within selected range cells, whether the radar itself is mounted on a moving platform or is stationary. Centering of the clutter-rejection notch of an MTI radar on the average Doppler frequency of the clutter with a number of range cells, in turn, permits the required cancellation process to be done more efficiently, provided the bandwidth of the Doppler frequency of the clutter is narrow. Such a condition exists in almost every practical situation except when two, or more, different kinds of clutter are present within the selected range cells.

A common way of implementing a TACCAR system is shown and described in Skolnik, "Radar Handbook," published by McGraw-Hill, Inc., New York, N.Y. (1970) pp. 17-32 through 17-36. In essence, the there disclosed system accomplishes the desired centering of the clutter rejection notch by varying the phase of the coherence oscillator, or COHO, in accordance with changes in phase of a voltage controlled oscillator, or VCO. The required phase changes of the VCO are determined by a sweep-to-sweep comparison of echo signals to produce analog signals representative of average Doppler frequency within a selected group of range cells. Because, however, the system uses nonlinear processing techniques, it may not be modified to a multiple delay line configuration. It follows, therefore, that when such a configuration is desired, it is necessary to employ other, more complicated, systems.

It is known that a TACCAR system may be implemented by converting the analog signals used for the sweep-to-sweep comparison to digital signals to permit the derivation, using digital techniques, of a Doppler frequency signal of all echo signals. Such a Doppler frequency signal may then be used to select the proper one of a plurality of different coherent oscillators. With this approach multiple cancellation may be effected, but the complexity of the resulting digital processing system is very great. For example, it is necessary to provide three duplicate digital processing channels to determine a single Doppler frequency in order to select the coherent oscillator having the proper frequency. Further, known digital processing systems do not incorporate the TACCAR principles.

Therefore, it is a primary object of this invention to provide an improved MTI radar using digital processing techniques to center the clutter-rejection notch at the average Doppler frequency of clutter within selected range cells.

Another object of this invention is to provide an improved MTI radar using digital processing techniques which is effective to reject clutter signals regardless of the Doppler velocity of the sources thereof.

Still another object of this invention is to provide an improved MTI radar using digital processing techniques to cancel clutter signals wherever such signals occur during each range sweep.

SUMMARY OF THE INVENTION AND BRIEF DESCRIPTION OF THE DRAWING

These and other objects of this invention are attained generally by providing two phase detectors in a signal receiver, with the signals into such detectors in quadrature, to permit the magnitude of each one of the clutter signals to be determined in one channel and the sense of each one of the clutter signals to be determined in another. The signals out of the phase detectors are converted to digital form, processed, combined and sampled to produce a digital signal indicative of the average Doppler velocity of clutter within a selected group of range cells. Such digital signal is applied as a correction signal to a digital phase shifter to shift the phase of the reference signal to the phase detectors, thereby finally causing the digital signal to be nulled when the actual average Doppler velocity of the clutter corresponds with the average Doppler velocity determined by the processing in the two channels.

For a more complete understanding of this invention, reference is now made to the following description of a preferred embodiment of this invention and to the accompanying drawing, in which the single FIGURE is a block diagram of an MTI radar incorporating the principles of this invention.

DESCRIPTION OF THE PREFERRED EMBODIMENT

Referring now to the drawing, it should be noted first that, for convenience, a partially coherent pulse Doppler radar has been selected to illustrate how this invention may be applied. Thus, the illustrated system includes a clock pulse generator 11, a system trigger generator 13, a transmitter 15, a duplexer 17 and an antenna 19, each of which is conventional in construction and operation to produce, periodically, a directional beam of electromagnetic energy (not shown) to illuminate targets (not shown) within such beam. Echo signals (not shown) from any and all targets are received by the antenna 19 and, after passing through the duplexer 17, are heterodyned in a signal mixer 21 with a reference signal from a stable local oscillator, stalo 23. The resulting intermediate frequency signals are passed through an I.F. amplifier 25 (which may limit such signals in a conventional manner). A portion of the electromagnetic energy out of the transmitter 15 is removed, by means of a directional coupler 27, and heterodyned with the reference signal from the stalo 23 in a mixer 29. The resulting signal, after appropriate gating and filtering (not shown), is applied to a coherence oscillator, coho 31. The output signal from the latter element, as is well known, is then locked in phase with each transmitted pulse.

The signals out of the I.F. amplifier 25 are divided, as shown, and then impressed on input terminals (not numbered) of a signal phase detector 33 and a herecalled Doppler sense detector 35. The latter element is a phase detector. The second input to the signal phase detector 33 and the Doppler sense detector 35 is, as shown, the phase coherent signal out of the coho 31, after such signal is passed through a digital phase shifter 37 and, in the case of the signal to the signal phase detector 33, a 90° phase shifter 39.

The output signals from the signal phase detector 33, which signals are bipolar video signals, are passed to an analog-to-digital converter, A/D converter 41, of conventional construction. The complexity of the A/D converter 41 depends upon the number of significant bits desired in the digital numbers to be processed, i.e., on the resolution desired. The now digitized signals are fed into a digital canceller 43, as shown. The output signals of the latter element, as is well known, are the difference signals between echo signals on successive sweeps. It is noted here, however, that, in the absence of any correction of the output signal of the coho 31, only echo signals from stationary targets are cancelled. Further, it is noted that, in any event, the sense of the Doppler velocity of each moving target is indeterminate.

The correction circuit now to be described obviates both of the just-mentioned difficulties. Thus, the output signal of the Doppler sense detector 35 is fed into A/D converter 45. This converter is a single bit converter, producing either a "one" or a "zero," depending on the phase relationship of each signal out of the I.F. amplifier 25 and the phase coherent signal out of the coho 31 (after such signal passes through the digital phase shifter 37). A moment's thought will make it clear that, because of the presence of the 90° phase shifter 39 in circuit with the signal phase detector 33, a "one," say, out of A/D converter 45 indicates a phase difference of between 0° and 180° in the signals into the signal phase detector while a "zero" indicates a phase difference of between 180° and 360° in such signals. In other words, a "one" or a "zero" out of A/D converter 45 is indicative of the sense of the slope of the signals out of the signal phase detector 33. Such digital sense signals out of A/D converter 45 are impressed on a digital multiplier 47 along with the difference signals out of the digital canceller 43. The digital multiplier 47, then, operates as a polarity reversing switch in accordance with the state of A/D converter 45 to remove the ambiguity from the difference signals out of the digital canceller 43. The digital signals out of the digital multiplier 47 are passed through range gates 49, 51, each of which is preferably enabled for a different period during each range sweep by a delayed trigger pulse from a variable delay circuit 53, 55 to sample the signals in desired range cells. Thus, for example, range gate 49 may be enabled so as to permit ground clutter signals (short range) and range gate 51 may be enabled to permit precipitation signals (long range) to be passed to digital integrators 57 and 57A respectively. At the end of each range gate, the digital signal out of each integrator is indicative of the average measured phase difference, in each range cell, between the reference signals from the coho 31 and the echo signals within the corresponding range gate. The digital signal out of the digital integrator 57 is stored in an integrator memory 59 (which is simply a shift register). At the end of each range sweep, i.e., after each period in which the integrator memory 59 is being updated, transfer gates 61 are enabled, by way of AND gate 63 actuated by the complementary output signals from range gates 49, 51, to shift the contents of the integrator memory 59 into a control register 65. The output signal of the latter is applied to the digital phase shifter 37, thereby to cause that element to shift the phase of the reference signal from the coho 31 in a direction to reduce the frequency difference between the reference signal and the echo signals received during each range gate. After several sweeps, the number being dependent on the parameters chosen for the correction circuitry just described, the frequency difference is brought to zero for targets having the average Doppler velocity of targets within each range gate.

To complete the illustrated system, the signal out of the digital canceller 43 is fed, through a digital to analog converter, D/A converter 67, to a utilization device 69. The latter, for example, may be a conventional indicator to display uncancelled signals, i.e., signals from moving targets.

While the invention has been illustrated and described in connection with its use in a two pulse canceller, partially coherent pulse radar, it will be obvious to those of skill in the radar art that many changes in the disclosed embodiment may be made without departing from the inventive concepts. For example, the invention may be used in any fully coherent radar. It is evident that the digital phase shifter may equally well be placed in circuit with the reference oscillator in such a radar to serrodyne the output signal in the same manner, and to the same effect, as in the disclosed system. Further, it is obvious that the concepts of the invention may be incorporated in a system using a multi-pulse canceller. Still further, it is clear that, because it is here contemplated to derive a signal representative of the sense of output of the signal phase detector, such signal may be processed using conventional techniques to determine whether an opening or a closing Doppler velocity is associated with each detected moving target whenever such a determination is desired. It is felt, therefore, that this invention should not be restricted to the proposed embodiment, but rather should be limited only by the spirit and scope of the following claims.

What is claimed is:

1. In the receiver of an adaptive MTI radar system, such receiver including a coherent oscillator and a digital phase shifter in circuit to provide a local oscillator signal having its phase varying in accordance with the average Doppler velocity of targets illuminated by radio frequency energy during predetermined intervals of time, such local oscillator signal thereby becoming a reference signal coherent with echo signals from targets moving at velocities near the average Doppler velocity of all targets to permit such echo signals to be cancelled, improved control circuitry for such digital phase shifter comprising:

a. quadrature phase detector means, responsive to a signal analogous to each echo signal on each one of the range sweeps and to the then existing reference signal out of the digital phase shifter, for producing a first group and a second group of video signals representative, respectively, of the magnitude and sense of the phase difference between each signal analogous to each echo signal and the then existing reference signal out of the digital phase shifter;

b. digital signal processing means, responsive to the first group and to the second group of video signals out of the quadrature phase detector, for producing first and second digital error signals, the first digital error signals being indicative of the difference in phase between corresponding echo signals during successive intervals of time, and the second digital error signals being indicative of the sense of such difference;

c. digital multiplier means for multiplying the first and the second digital error signals to produce a third group of digital signals, each digital signal in such third group being representative to the magnitude and sense of the phase difference between each signal analogous to each echo signal and the then existing reference signal out of the digital phase shifter;

d. digital integrator means, responsive to the third group of digital signals, for producing a digital correction signal corresponding to the average of the third group of digital signals; and e. means for applying the digital correction signal to the digital phase shifter.

* * * * *